United States Patent [19]

Cochran et al.

[11] 3,800,078

[45] Mar. 26, 1974

[54] DIGITALLY COMPENSATED SCANNING SYSTEM

[75] Inventors: William H. Cochran, Dover; Gerald M. Heiling, Rochester, both of Minn.

[73] Assignee: International Business Machines Corporation, Armonk, N.Y.

[22] Filed: Dec. 18, 1972

[21] Appl. No.: 316,336

[52] U.S. Cl. ........................ 178/7.1, 340/146.3 AG

[51] Int. Cl. ........................ H04n 3/14, H04n 5/30

[58] Field of Search ...................... 178/7.1, DIG. 29; 235/61.11 E; 340/172.5, 347 CC, 347 AD, 347 DA, 146.3 H, 146.3 AG; 250/219 D, 219 DC, 208, 209

[56] References Cited

UNITED STATES PATENTS 3,544,970 12/1970 Weinbaum ...................... 340/172.5

*Primary Examiner*—Robert L. Richardson
*Assistant Examiner*—R. John Godfrey
*Attorney, Agent, or Firm*—Donald F. Voss

[57] ABSTRACT

A self-scanned photodiode array operating in the recharge current mode generates a serial video information output signal as light from a light emitting diode illuminator is reflected from the scanned document and imaged onto the photodiode array. A photodiode sensitivity and illumination variance compensation signal is generated during a write mode as the photodiode array scans a white background. The serial compensation signal thus generated is converted into an N bit binary code for each photodiode in the array. The N bit binary code is stored. Thereafter, when scanning printed or written information on the document during an operational mode, the serial video information signal is digitized as in the write mode and forms an address together with the stored digitized compensation bits for addressing a stored table of normalized contrast ratios in the form of M data bits. These M data bits are passed to an output buffer and converted to an analog signal equal to 1 minus the contrast ratio to provide a corrected serial video information signal.

Compensation for photodiode leakage current and periodically induced clocknoise is provided by initially scanning black or blocking light from the photodiode array. The resulting signal from the photodiode array is converted to an N bit binary code which is stored. The stored code is used in the same way as the stored code for photodiode sensitivity and illumination variations and addresses a black level correct value in a table look-up store. The data stored in this look-up table are effective subtractions of coherent noise from the serial video data and white background data prior to a contrast ratio table look-up.

10 Claims, 7 Drawing Figures

DIGITALLY COMPENSATED SCANNING SYSTEM

BACKGROUND OF THE INVENTION

1. Field of the Invention

This invention relates to improved circuitry for providing compensation for photodiode sensitivity and illumination variances in a self-scanned photodiode array scanning system.

The invention is particularly useful in information collection systems where a self-scanned photodiode array is used to scan large areas or entire documents. The video information generated by the photodiode array is then further processed by information recognition or reproduction systems. The performance of the recognition or reproduction system, among other parameters, is dependent upon the validity of the video information. The video information amplitude errors due to photodiode sensitivity and illumination variances can be greater than ±8 percent, and as such, are intolerable. A high performance recognition or reproduction system requires that compensation be provided for the video information generated by the self-scanned photodiode array.

2. Description of the Prior Art

This invention provides another way for dynamically compensating for photodiode sensitivity and illumination variances. Other known systems for providing dynamic compensation or photodiode sensitivity and illumination variances are set forth in commonly assigned co-pending patent applications Ser. No. 306,135 for "Sensitivity Compensation for a Self Scanned Photodiode Array" and Ser. No. 316,337 for "Compensation for a Scanning System." The present invention, like the invention of Ser. No. 316,337, generates the sensitivity and illumination variance compensation signal during a write mode. However, in the present invention the serial compensation signal thus generated is converted into a N bit binary code for each photodiode in the array and is stored. Then, during an operational or read mode, the serial video information signal is digitized as in the write mode and forms an address together with the stored digitized compensation bits for addressing a stored table of normalized contrast ratios in the form of M data bits. The M data bits are passed to an output buffer and then can be converted to an analog signal. The advantage of the present invention is that the table which is addressed by the digitized serial video information bits and the stored compensation bits can store normalized contrast ratios, 1 minus the contrast ratio or predetermined contrast ratios depending upon the desired enhancement of the serial video information. Further, by clearing the output buffer, the serial video information is forced to appear as having a contrast ratio of 1. The utilization system which would include a threshold circuit for quantitization of the video contrast signal to black, white, or multiple grey levels can perform its function more efficiently with the enhanced serial video information which is a function of contrast ratios.

An alternate embodiment of the invention includes a black level correction circuit to compensate for coherent noise such as diode leakage currents and periodically induced clock noise and also includes circuitry for improving cost performance.

SUMMARY

The principal objects of the invention are to provide an improved compensation circuit for a self-scanned photodiode array scanning system which (A) dynamically compensates for photodiode sensitivity and illumination variances; (B) provides flexible dynamic compensation for photodiode sensitivity and illumination variances in that various functions of contrast ratio can be used for compensation; (C) compensates for coherent noise, such as diode leakage currents and periodically induced clock noise; (D) has a high degree of accuracy; and (E) provides for updating the stored background compensation signal.

DESCRIPTION

Figure 1:
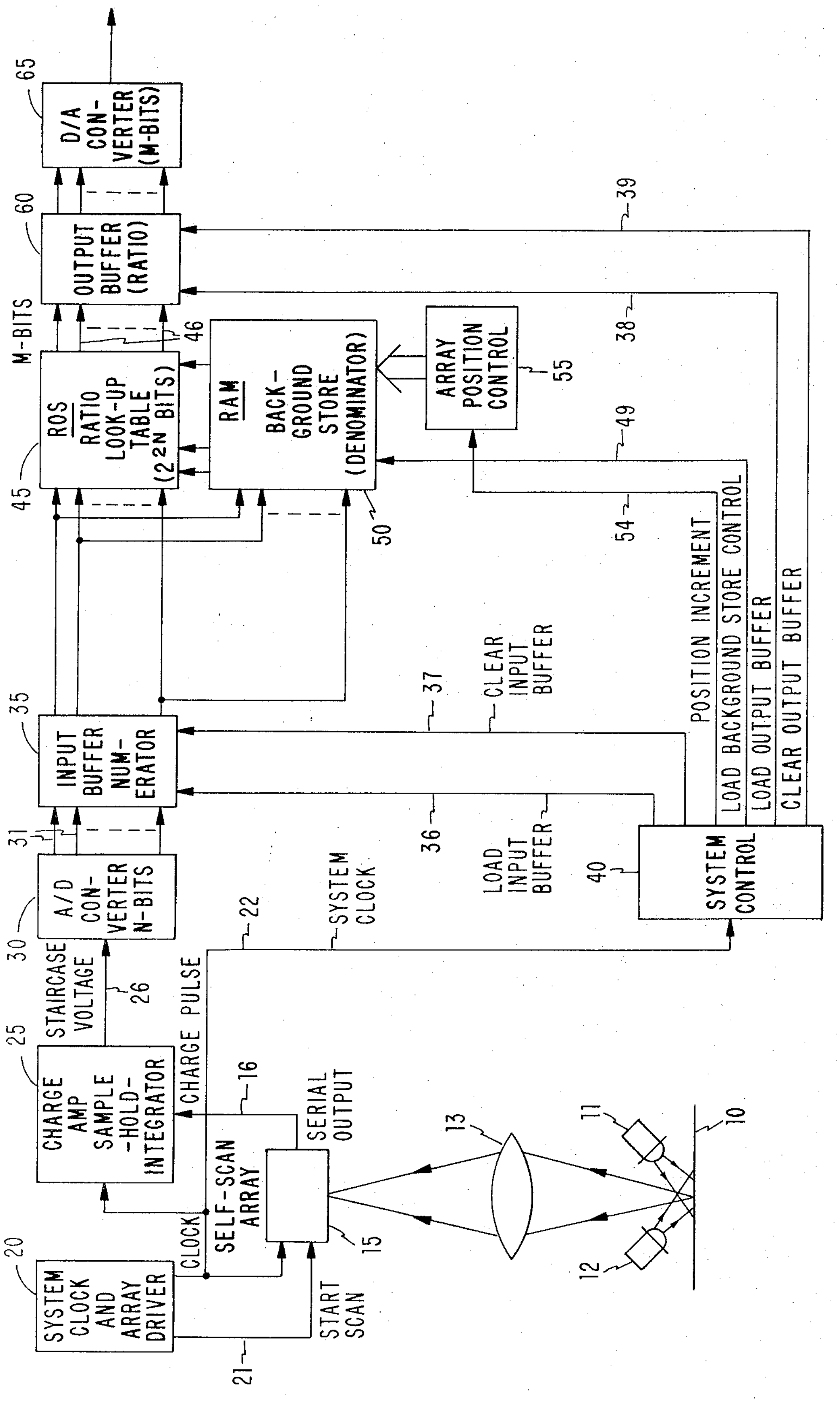
FIG. 1 is a schematic diagram illustrating one embodiment of the invention.

With reference to the drawings and particularly to FIG. 1, the invention as illustrated by this embodiment provides compensation for photodiode sensitivity and illumination variances but does not include compensation for coherent noise such as diode leakage current and periodically induced clock noise. In this embodiment, document 10 is flooded with light from light emitting diodes 11 and 12 over that portion of the document which is imaged by lens 13 onto self-scanned photodiode array 15. The total power output required from the light emitting diodes 11 and 12 to achieve 100 percent saturation in the self-scanned photodiode array 15 is determined by: $P=(CE1)^{-1}(CE2)^{-1}(S/T)\,R$ where:

$CE1$ = the ratio of light intensity at the document to the light intensity at the light emitting diode (LED) exit pupil.

$CE2$ = the collection efficiency of the imaging optics.

$S$ = saturation sensitivity of the self-scanned photodiode array.

$T$ = integration time.

$R$ = document reflectance.

Normally the array 15 will not be operated near 100 percent saturation of the photodiode array. The self-scanned photodiode array 15 is operated in the recharge current mode and has a serial signal output on conductor 16 where the output from each photodiode is a charge pulse proportional to the average light intensity falling on the diode during the integration period. The self-scanned diode array 15, which is commercially available, includes a clock and array driver circuit 20 for providing a start scan signal on conductor 21 and clock pulses on conductor 22. The clock may be either externally driven or free-running. Its repetition rate is set equal to the desired bit rate. The scan is initiated by the start scan signal which is in advance of a clock pulse. The charge pulse for each photodiode of array 15 appearing on conductor 16 is applied serially to an amplifier and sample and hold integrator circuit 25. The output of circuit 25 is an analog voltage proportional to the average light intensity for each photodiode. Clock pulses are also applied to circuit 25 and the output from this circuit is applied over conductor 26 to an A/D converter 30.

Prior to reading information from document 10, the photodiode sensitivity and illumination variance compensation signal is generated during a write mode as the photodiode array 15 scans a white background area on document 10. During this write mode, the serial compensation signal from photodiode array 15 is transmitted over conductor 16 to circuit 25 and the analog signal from circuit 25 is digitized by A/D converter 30. The digitized bits of data are transferred in parallel via conductors 31 to input buffer 35 under control of a Load Input Buffer signal on conductor 36. Buffer 35 was initially reset by a Clear Input Buffer signal on conductor 37. The Clear and Load input buffer signals come from system control 40 which consists of a combination of logic circuits gated by clock signals from the system clock and array driver circuit 20.

Figure 2:
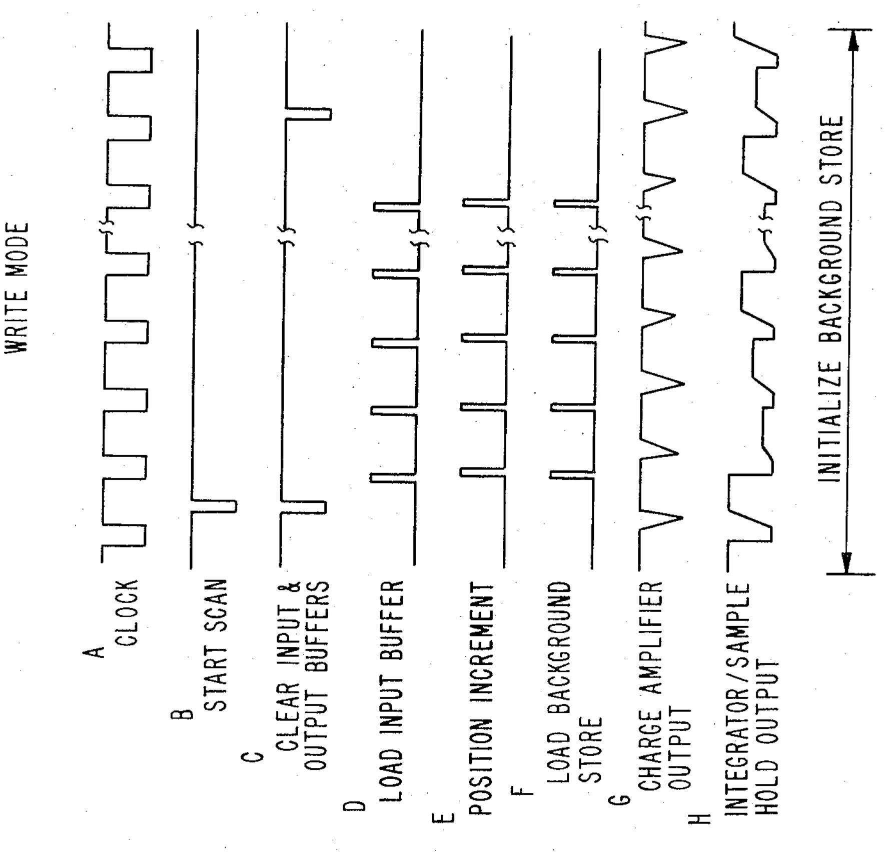
FIG. 2 is a waveform diagram showing the signals during a background store write mode for the embodiments of FIGS. 1 and 4.

The waveforms of the signals during this write mode are shown in FIG. 2. It is seen that the input and output buffers 35 and 60 are cleared at the start of a scan by a Clear Input and Output Buffer signal represented by waveform C. The Load Input Buffer signal represented by waveform D starts at the end of one clock pulse and terminates prior to the beginning of the next clock pulse. The outputs of the input buffer 35 are applied to a data storage 45 for storing contrast ratios and to a background storage 50 for storing addresses for addressing storage 45. Since the Load Background Store signal represented by waveform F is available at the termination of the Load Input Buffer signal, the digital data in input buffer 35 is transferred to background storage 50 to subsequently provide the first N bits of the 2N address bits for addressing storage 45. The positions in which the digital bits are stored in storage 50 is controlled by signals from array position control circuit 55. The array position control circuit 55 is controlled by a Position Increment signal represented by waveform E from system control 40. A Position Increment signal occurs at the fall of each Load Input Buffer signal.

The write mode terminates after background storage 50 has been loaded. This occurs during a normal scan of the white background area on document 10. The white background area on document 10 is assured by providing particular format constraints with respect to location of information on the document. For example, a clear band of background is assured by providing a suitable margin at the top of the document.

Figure 3:
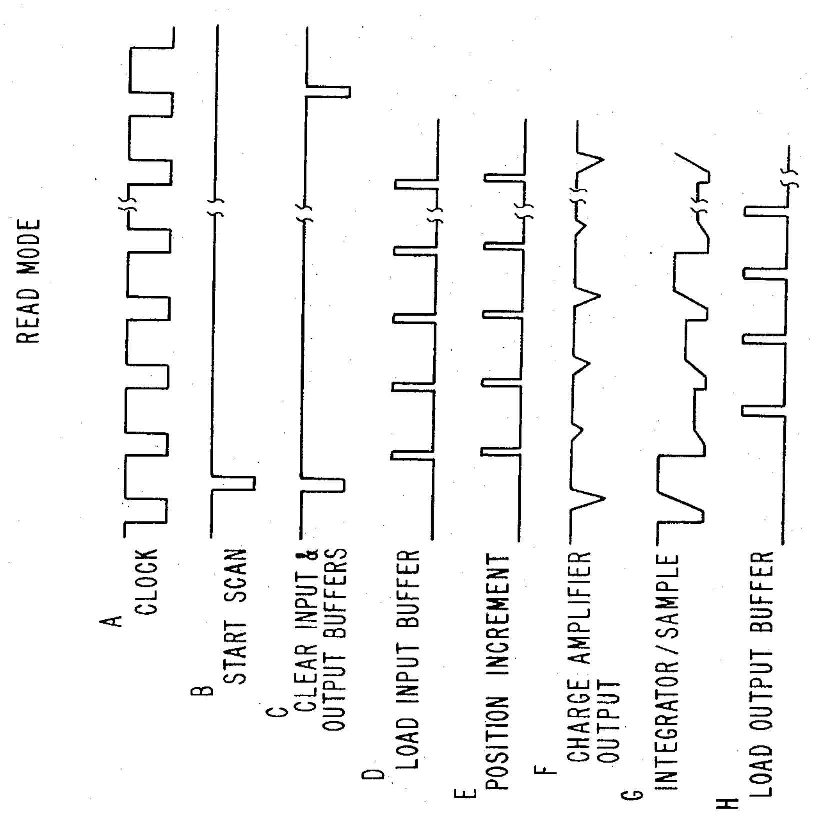
FIG. 3 is a waveform diagram showing the signals during the operating or read mode of the embodiment in FIG. 1.

The operation of the invention for the embodiment illustrated in FIG. 1 during an operational or read mode is represented by the waveforms in FIG. 3. Clock signals from system clock and array driver 20 are shown as waveform A. The start scan signal is represented by waveform B and it occurs during a clock pulse. The Clear Input and Output Buffers signal shown as waveform C occurs coincident with the start scan signal and at the end of a scan of the array 15 and is applied over conductors 37 and 39 to reset input buffer 35 and output buffer 60. The amplified serial video information output signal from photodiode array 15 is represented by waveform F. The output signal for the first diode in the array is integrated and held by sample and hold integrator 25 and the analog signal produced from this photodiode is converted into digital bits by A/D converter 30. These N bits are then loaded into buffer 35 under control of a Load Input Buffer signal shown as waveform D. The background storage 50 is incremented as a Position Increment signal is applied to array position control 55 whereby the N stored bits for the first diode addresses the table in storage 45 together with the N bits for the first diode now residing in input buffer 35. The contrast ratio lookup table in storage 45 has M binary bits for each normalized background level for each $2^{2N}$ possible contrast ratios. The M bits addressed by the N bits in storage 50 and the N bits in buffer 35 are transferred over conductors 46 to output buffer 60 under control of a Load Output Buffer signal from system control 40 which appears as waveform H in FIG. 3 and is applied over conductor 38 to output buffer 60 in FIG. 1. Buffer 60 was initially cleared by a Clear Output Buffer signal on conductor 39. The digital data in output buffer 60 is converted to an analog signal by D/A converter 65. The process just described continues for each photodiode in the array 15. The output from D/A converter 65 is the corrected serial video information signal. The D/A converter 65 is included in those systems where the enhanced serial video information signal is preferred to be in analog form. Most utilization systems such as character recognition systems, prefer that the video information signal be in analog form so as to facilitate thresholding and quantization of the video signal. Of course, the digital output of buffer 60 could be used directly if it were so desired. The value stored in storage 45 can be contrast ratios $(R_{jw}-R_{js})\div R_{jw}$ or any other functions of $(R_{js}, R_{jw})$ where $R_{js}$=signal reflectivity for the $j$th photodiode and $R_{jw}$=background reflectivity for the $j$th photodiode.

Figure 4:
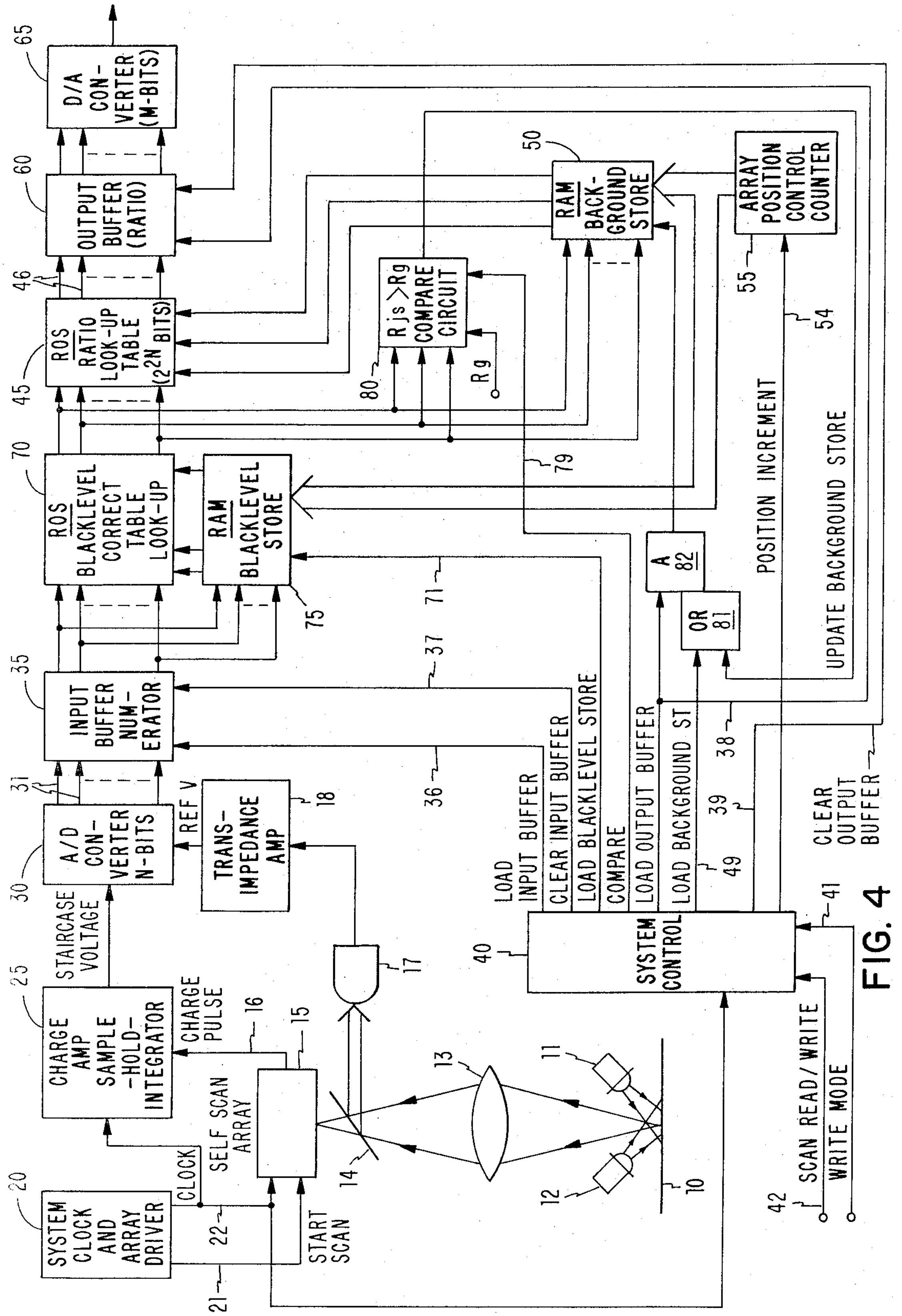
FIG. 4 is a schematic block diagram illustrating a preferred embodiment of the invention.
Figure 5:
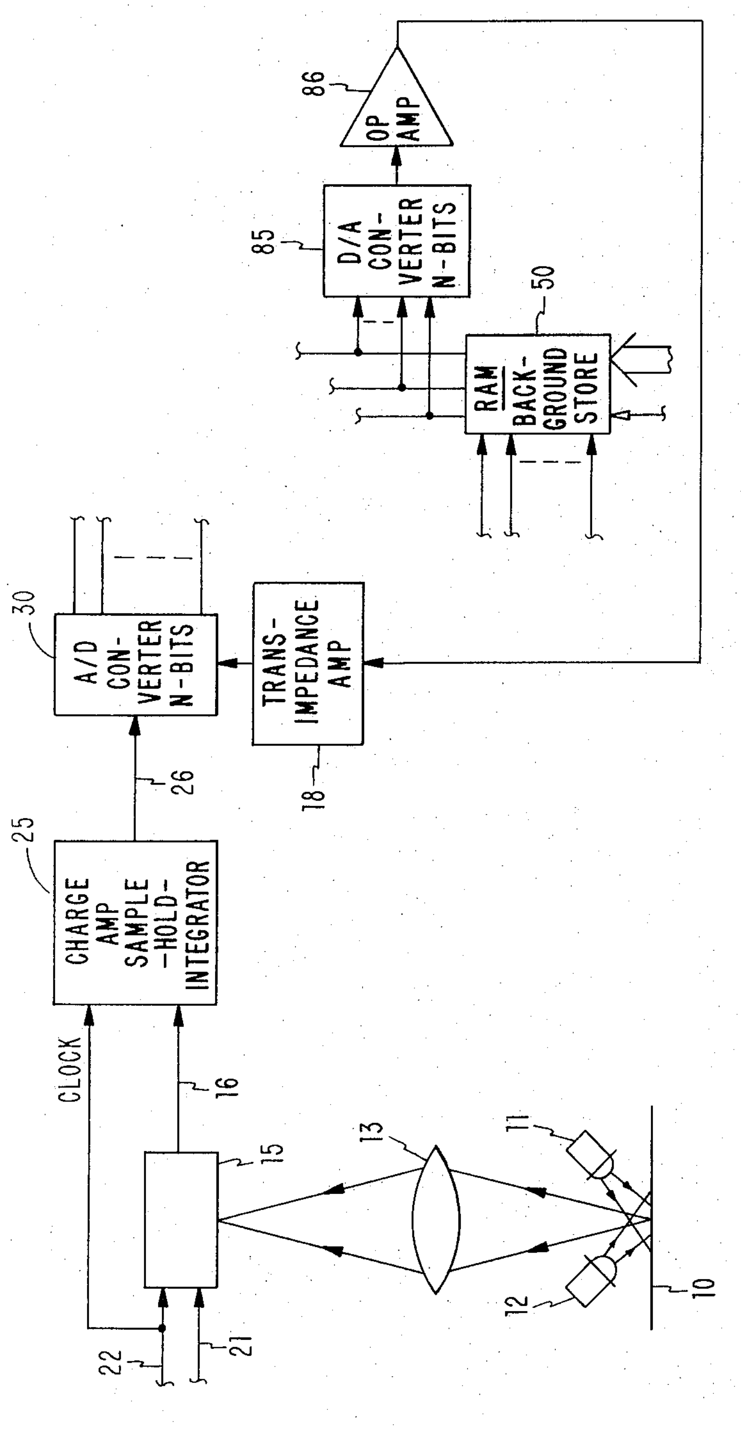
FIG. 5 is a schematic diagram illustrating an alternate arrangement for minimizing the number of binary bits for the A to D converter of FIG. 4.

In addition to compensating for photodiode sensitivity variances and illumination variances, it is desirable to provide compensation for coherent noise such as photodiode leakage current and periodically induced clock noise. The preferred embodiment of the invention as shown in FIG. 4 provides such additional compensation. Elements shown in FIG. 4 which are like elements of FIG. 1 are given the same reference characters. The preferred embodiment also includes arrangement for minimizing the number of binary bits required from A/D converter 30 and still provide the desired system accuracy. Two different arrangements are shown for performing the minimization function. One arrangement is shown in FIG. 4 and it includes beam splitter 14 which directs a portion of the reflected light to a phototransistor 17. The signal developed by phototransistor 17 is proportional to spatially averaged document reflectivity. The output of phototransistor 17 is applied to transimpedance amplifier 18 and its output is a reference voltage for A/D converter 30. The alternate approach for performing the minimization function is shown in FIG. 5. In this arrangement, the data in background storage 50 is averaged by means of a white level follower consisting of D/A converter 85 and operational amplifier 86. The output of operational amplifier 86 is fed to transimpedance amplifier 18. The net result of either arrangement is to force the A/D converter reference voltage close to the average background or document reflectivity signal level to result in an improved A/D converter accuracy.

The output of A/D converter 30 is stored in input buffer 35 in the same manner as in connection with the embodiment of FIG. 1. In the preferred embodiment, however, two write modes are used. A first write mode is used to store the black level noise for each photodiode in the self-scanned photodiode array 15. System control 40 has additional inputs which are Write Mode and Scan Read/Write on conductors 41 and 42 respectively.

Figure 6:
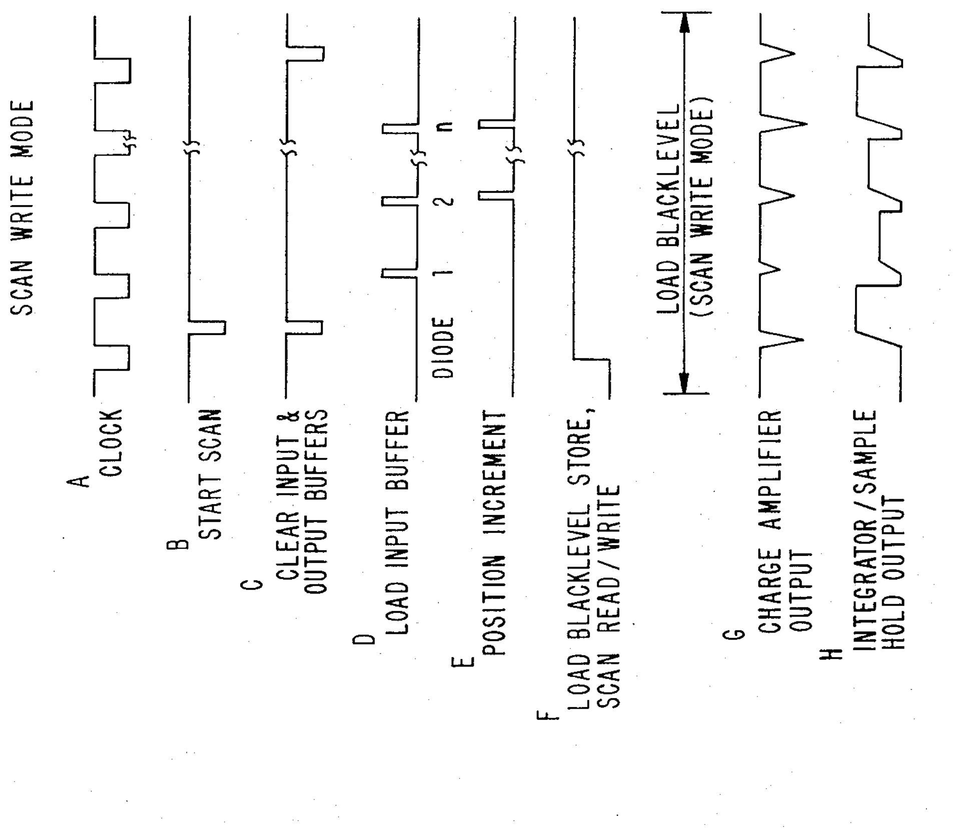
FIG. 6 is a waveform diagram showing the signals during a black level store write mode of the embodiment shown in FIG. 4.

These inputs are mutually exclusive and can originate from an operator controlled switch, not shown. The operator would place the switch to the Write Mode position for the write mode operation and to the Scan Read/Write position for the operational or read mode. During this write mode, light is blocked off from the array 15 or the array is caused to scan a non-reflective black background. Also, during this write mode system control 40 provides a Load Black Level control signal, see also waveform F, FIG. 6, on conductor 71 for loading the output of buffer 35 into black level storage 75. Black level storage 75 is incremented under control of array position control 55. The digital data stored in black level storage 75 is used for addressing black level correct table lookup storage 70 together with the digital data in input buffer 35. Storage 70 contains digital data for each photodiode of the array 15 representing the video output for the photodiode minus the coherent noise of that photodiode. The output of the black level correct table lookup storage 70 is applied to storage 45, to background storage 50 and to compare circuit 80. Background storage 50 is loaded in a manner similar to that of the embodiment of FIG. 1 except in this instance the coherent noise of the photodiode array 15 will be eliminated from the white background level signal before the ratio lookup function is performed.

Compare circuit 80 facilitates updating background storage 50 dynamically. The Load Output Buffer signal facilitates the updating of background storage 50. The Load Output Buffer signal is applied to logical AND circuit 82 together with the output from OR circuit 81. OR circuit 81 receives the Load Background Store signal from system control 40 and an Update Background Store signal from compare circuit 80. Compare circuit 80 provides the Update Background Store signal when the signal $Rjs$ is greater than a predetermined grey level $Rg$ which is applied to compare circuit 80. The comparison operation takes place under control of a Compare signal provided by system control 40 on conductor 79. The N bit data in input buffer 35 is loaded into background storage 50 when the Load Output Buffer signal is available and if $Rjs$ is greater than $Rg$.

Figure 7:
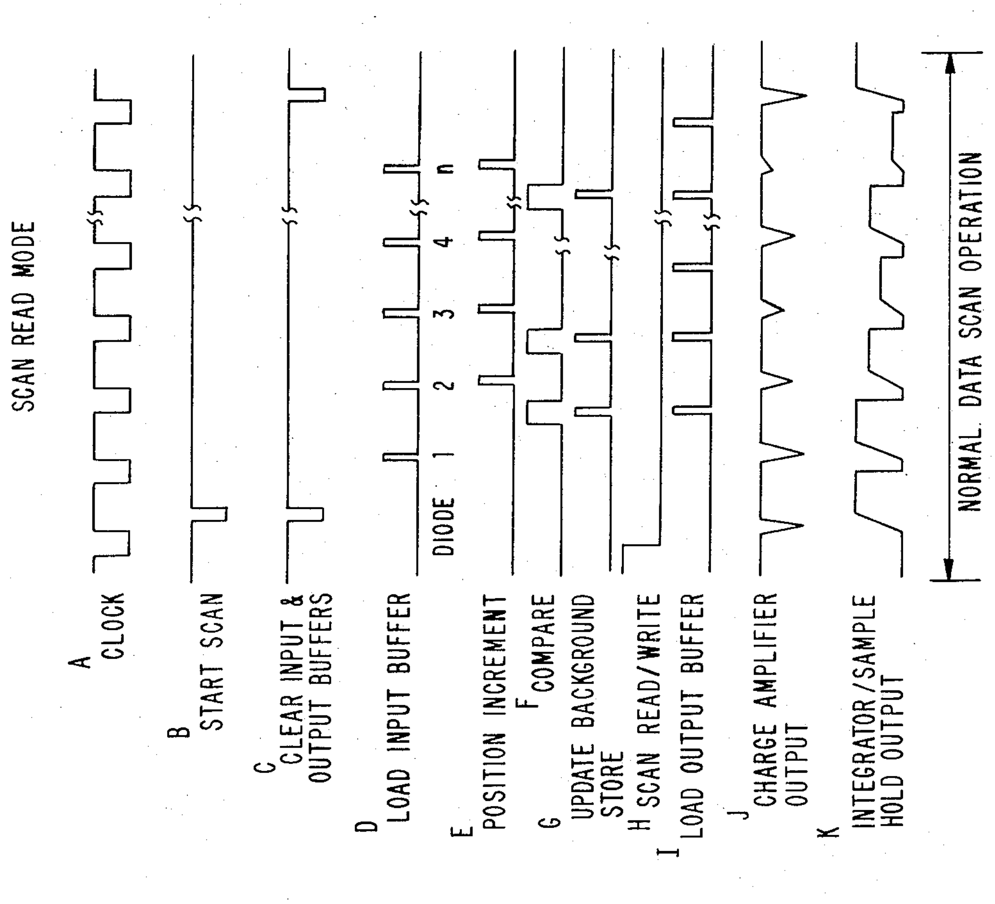
FIG. 7 is a waveform diagram showing the signals during the operating or read mode of the embodiment shown in FIG. 4.

The initial loading of background storage 50 takes place in a background storage write mode and the waveforms occurring during this operation are the same as those for the embodiment of FIG. 1 as shown in FIG. 2. The waveform for the embodiment of FIG. 4 when in the operational or read mode are shown in FIG. 7. The clock pulses are represented by waveform A. A scan is started in the same manner as described for the embodiment of FIG. 1 and waveform B represents start scan. Input and output buffers 35 and 60 are cleared by the signal represented by waveform C. Input buffer 35 is then loaded under control of a Load Input Buffer signal, waveform D, with digital data from A/D converter 30 which represents the N bit code for the first photodiode. The compare operation takes place next as represented by waveform F and background storage 50 is updated if the signal reflectivity for the first diode is greater than $Rg$. This is represented by waveform G. The Load Output Buffer signal is provided during the compare operation as represented by waveform I. Array position control 55 then provides a position address for addressing storages 50 and 75 in response to the Position Increment signal from control 40 as represented by waveform E. The operation just described repeats for each photodiode of the array 15 and an enhanced serial video information signal is provided as the output of D/A converter 65.

From the foregoing, it is seen that the invention provides compensation for photodiode sensitivity and illumination variances in a self-scanned photodiode array scanning system. It is further seen that the invention provides compensation for coherent noise such as diode leakage currents and periodically induced clock noise in the self-scanned photodiode array scanning system. This compensation improves the accuracy of the contrast ratio measurement and permits operation of the self-scanned photodiode array considerably below saturation levels. This enables a lower illumination intensity for a predetermined bit rate or permits operation at a higher bit rate with the same illumination intensity. Further, the invention makes the accuracy of the A/D converter independent of the background signal. The invention provides for dynamic updating of the white background storage so as to remove constraints on document format. Further, the ratio lookup table in storage 45 can be loaded to provide the contrast ratio or any other function of the contrast ratio.

What is claimed is:

1. A sensitivity compensation circuit for a self-scanned photodiode array having a serial video information output comprising digitizing means for digitizing said serial video information output, first storage means for storing said digitized serial video information output, means operative during a write mode for transferring said digitized serial information output to said first storage means, second storage means for storing a table of groups of bits representing corrected video information signals of addresses addressable by digitized serial video information from said digitizing means and from said first storage means, means operative during a read mode for retrieving digitized serial video information from said first storage means in synchronism with the digitization of serial video information from said photodiode array to readout from said second storage means said stored groups of bits representing corrected video information signals.

2. The sensitivity compensation circuit of claim 1 further comprising means for converting said groups of bits read out from said second storage means to an analog signal to provide a corrected serial video information signal.

3. The sensitivity compensation circuit of claim 1 wherein said table of groups of bits representing corrected video information signals is in the form of functions of contrast ratios.

4. The sensitivity compensation circuit of claim 1 wherein said table of groups of bits representing corrected video information signal is in the form of quantities (1− normalized contrast ratios).

5. The sensitivity compensation circuit of claim 2 further comprising means for buffering said groups of bits from said second storage means prior to said converting means converting them to an analog signal, and
means for clearing said buffering means so as to represent a normalized contrast ratio of 1 between successive readouts of groups of bits from said second storage means.

6. The sensitivity compensation circuit of claim 1 wherein said second storage means is a read only storage.

7. A sensitivity compensation circuit for a self-scanned photodiode array scanning system having a serial and video information output comprising
digitizing means for digitizing said serial video information output so as to provide a series of groups of N bits corresponding to the series of photodiodes in said photodiode array,
control means for providing a plurality of control signals,
buffer means operative under control of a first control signal from said control means for successively receiving and buffering a group of N bits from said digitizing means,
first storage means connected to said buffer means and operative under a second control signal from said control means to receive and store said series of groups of first N bits as each group of first N bits is entered into said buffer means,
second storage means connected to said buffer means and to said first storage meand and having groups of second N bits stored at addresses addressable by said first N bits from said buffer means and said first N bits from said first storage means, said second N bits of each group being in coded form to represent the video output of a corresponding photodiode minus the coherent noise of said corresponding photodiode,
third storage means connected to receive and store successively a group of second N bits from said second storage means under control of a third control signal from said control means,
fourth storage means connected to said second and third storage means and having groups of M bits stored at locations addressable by a group of second N bits from said second storage means and a group of second N bits from said third storage means read out in synchronism under control of a fourth control signal from said control means, said groups of M bits stored in said fourth storage means representing corrected video information and being read out from said fourth storage means as the same is addressed by said second and third storage means.

8. The sensitivity compensation circuit of claim 7 further comprising buffer means connected to said fourth storage means to receive a group of bits read therefrom, and
means connected to said output buffer means for converting the digital signals therein to an analog signal to provide a corrected serial video information signal.

9. The sensitivity compensation circuit of claim 7 further comprising means for generating a reference voltage proportional to an average background signal level and
means for applying said reference voltage to said digitizing means.

10. The sensitivity compensation circuit of claim 7 further comprising means for dynamically updating said third storage means.

* * * * *

PO-1050
(5/69)

UNITED STATES PATENT OFFICE
CERTIFICATE OF CORRECTION

Patent No. 3,800,078 Dated March 26, 1974

Inventor(s) William H. Cochran et al

It is certified that error appears in the above-identified patent and that said Letters Patent are hereby corrected as shown below:

Claim 7, line 41, delete "meand" and substitute --means--.

Signed and sealed this 29th day of October 1974.

(SEAL)
Attest:

McCOY M. GIBSON JR.
Attesting Officer

C. MARSHALL DANN
Commissioner of Patents